US012772088B2

(12) United States Patent
Bergström et al.

(10) Patent No.: US 12,772,088 B2
(45) Date of Patent: Oct. 20, 2026

(54) EARLY RADIO MEASUREMENT RELAXATION REPORTING

(71) Applicant: Telefonaktiebolaget LM Ericsson (publ), Stockholm (SE)

(72) Inventors: Mattias Bergström, Sollentuna (SE); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 293 days.

(21) Appl. No.: 18/292,280

(22) PCT Filed: Jul. 22, 2022

(86) PCT No.: PCT/EP2022/070588
§ 371 (c)(1),
(2) Date: Jan. 25, 2024

(87) PCT Pub. No.: WO2023/011942
PCT Pub. Date: Feb. 9, 2023

(65) Prior Publication Data
US 2024/0334226 A1 Oct. 3, 2024

Related U.S. Application Data

(60) Provisional application No. 63/229,239, filed on Aug. 4, 2021.

(51) Int. Cl.
*H04W 24/10* (2009.01)
*H04W 76/27* (2018.01)

(52) U.S. Cl.
CPC .......... *H04W 24/10* (2013.01); *H04W 76/27* (2018.02)

(58) Field of Classification Search
CPC . H04W 24/10; H04W 76/27; H04W 36/0088; H04W 24/02
See application file for complete search history.

(56) References Cited

U.S. PATENT DOCUMENTS

2012/0178494 A1* 7/2012 Haim .................. H04W 52/365 455/522
2020/0383022 A1* 12/2020 Shrestha ............ H04W 36/362
(Continued)

OTHER PUBLICATIONS

International Search Report and Written Opinion of the International Searching Authority, PCT/EP2022/070588, mailed Jan. 13, 2023, 21 pages.
(Continued)

*Primary Examiner* — Charles C Jiang
*Assistant Examiner* — Rachel Elizabeth Cerlanek
(74) *Attorney, Agent, or Firm* — Sage Patent Group

(57) ABSTRACT

A method of operating a wireless device in a communication network includes switching the wireless device from INACTIVE or IDLE state to an ACTIVE state. After switching to the ACTIVE state, the method determines whether a fulfillment or unfulfillment condition for radio measurement relaxation has been persistently met for at least a time-to-trigger (TTT) period that at least partially includes a time period during which the wireless device was in the INACTIVE or IDLE state. In response to determining that the fulfillment or unfulfillment condition has been met for the TTT period, the method transmits a radio measurement relaxation report to a radio access network node indicating that the fulfillment or unfulfillment condition has been met.

11 Claims, 11 Drawing Sheets

(56) References Cited

U.S. PATENT DOCUMENTS

| | | | | |
|---|---|---|---|---|
| 2021/0105643 | A1* | 4/2021 | Kim | H04W 48/16 |
| 2021/0105649 | A1* | 4/2021 | Lee | H04W 24/10 |
| 2021/0235344 | A1* | 7/2021 | Jung | H04W 24/08 |

OTHER PUBLICATIONS

Vivo, "RRM measurement relaxation in time domain," 3GPP TSG-RAN WG2 Meeting #107, R2-1909534, Prague, Czech Republic, Aug. 26-30, 2019, 4 pages.

3GPP TS 38.304 V16.5.0 (Jun. 2021); 3rd Generation Partnership Project; Technical Specification Group Radio Access Network; NR; User Equipment (UE) procedures in Idle mode and RRC Inactive state (Release 16), 39 pages.

3GPP TS 38.331 V16.5.0 (Jun. 2021); 3rd Generation Partnership Project; Technical Specification Group Radio Access Network; NR; Radio Resource Control (RRC) protocol specification (Release 16), 959 pages.

Nokia et al., "Revised WID on support of reduced capability NR devices," 3GPP TSG RAN Meeting #91e, RP-210918 (Revision of RP-210894), Electronic Meeting, Mar. 22-26, 2021, 6 pages.

* cited by examiner

EARLY RADIO MEASUREMENT RELAXATION REPORTING

CROSS REFERENCE TO RELATED APPLICATIONS

This application is a 35 U.S.C. § 371 national stage application of PCT International Application No. PCT/EP2022/070588 filed on Jul. 22, 2022, which in turn claims domestic priority to U.S. Provisional Patent Application No. 63/229,239, filed on Aug. 4, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Referring to FIG. 1, a wireless communication system typically includes a base station 10 that communicates with a mobile wireless device 20, sometimes referred to as a user equipment, or UE 20. The base station 10 receives uplink communications 22 from the UE 10 and transmits downlink communications 24 to the UE 20.

The 5G wireless standard, which is the fifth generation of cellular technology, is designed to increase speed, reduce latency, and improve flexibility of wireless services. A 5G system (5GS) includes both a new radio access network (NG-RAN) which makes use of a new air interface called New Radio (NR), and a new core network (5GC).

The initial release of 5G in Release 15 is optimized for mobile broadband (MBB) and ultra-reliable and low latency communication (URLLC). These services require very high data rates and/or low latency and therefore puts high requirements on the UE. To enable 5G to be used for other services with more relaxed performance requirements a new low complexity UE type is introduced in Release 17, called 'reduced capability NR devices' or RedCap. The low complexity UE type is particularly suited for machine type communication (MTC) services, such as wireless sensors or video surveillance, but it can also be used for MBB services with lower performance requirements such as wearables. The low complexity UE has reduced capabilities compared to a Release 15 NR UE such as possibility to support lower bandwidth compared to what is currently required for a NR UE and possibility to support only one reception (Rx) branch and one MIMO layer.

When an NR device is in RRC CONNECTED mode, it may be configured to perform radio resource measurements, such as radio resource management (RRM) measurements. RRM measurements include, for example, measurements of signal strength at the UE. The UE can be configured to report such measurements to the network.

Radio resource measurements may consume UE power due to the need to perform measurement and also the reporting of those measurements. Hence it is discussed in 3GPP to introduce relaxed radio measurements in CONNECTED mode. The measurement requirements may be relaxed, for example, by decreasing the frequency at which the UE needs to perform a measurement.

Relaxed radio measurements may save some UE energy. However, they may at the same time reduce the accuracy of the measurements. Moreover, some measurements may never be performed or sent to the network. Hence the radio measurement relaxation should only be performed when certain conditions are met.

It has been discussed that the UE shall monitor certain conditions and report to the network when they are fulfilled and not. One possible condition is that the UE-measured reference signal received power (RSRP) or reference signal received quality (RSRQ) is above a certain threshold. In response to such a report, the network may configure the UE to perform radio measurement relaxation. Two have been discussed. In a first approach, the network explicitly indicates that the UE shall apply a relaxed radio measurement behavior (the behavior would likely be specified in a specification, e.g. that the frequency of the measurements is reduced). In a second approach, the network reconfigures the radio measurement configuration for the UE. For example, the network may deconfigure measurements on some frequencies, or the periodicity of radio measurement reporting may be increased, etc.

SUMMARY

A method of operating a wireless device in a communication network according to some embodiments includes switching the wireless device from INACTIVE or IDLE state to an ACTIVE state, and, after switching to the ACTIVE state, determining whether a fulfillment or unfulfillment condition for radio measurement relaxation has been persistently met for at least a time-to-trigger (TTT) period that at least partially includes a time period during which the wireless device was in the INACTIVE or IDLE state. In response to determining that the fulfillment or unfulfillment condition has been met for the TTT period, the wireless device transmits a radio measurement relaxation report to a radio access network (RAN) node indicating that the fulfillment or unfulfillment condition has been met.

The method may further include monitoring a network parameter while in the IDLE or INACTIVE state to determine whether the fulfillment condition or unfulfillment condition has been met, and determining while the wireless device is in the IDLE or INACTIVE state that the fulfillment or unfulfillment condition has been met.

The method may further include, in response to determining that the fulfillment or unfulfillment condition has been met during the IDLE or INACTIVE state, starting a TTT timer that has a duration equal to the TTT period.

The fulfillment condition may indicate that the wireless device is in a state that is suitable for radio measurement relaxation.

The fulfillment condition may include a power level and/or quality of a reference signal received by the wireless device being greater than a threshold value.

The unfulfillment condition indicates that the wireless device is in a state that is unsuitable for radio measurement relaxation. The unfulfillment condition may include a power level and/or quality of a reference signal received by the wireless device being less than a threshold value.

The method may further include, after switching to ACTIVE state, starting a timer having a timer duration, wherein the radio measurement relaxation report is sent after expiration of the timer. The timer may have a duration different than the TTT period. In some embodiments, the duration of the timer may be less than the TTT period.

The method may further include receiving a configuration for radio measurement relaxation after entering ACTIVE state, wherein determining that the fulfillment or unfulfillment condition has been met for the TTT period is performed in response to receiving the configuration for radio measurement relaxation.

A method of operating a wireless device in a communication network according to some embodiments includes, while in an ACTIVE state, receiving a configuration for radio measurement relaxation, determining whether a fulfillment or unfulfillment condition for radio measurement relaxation has been persistently met for at least a TTT period, wherein the TTT period at least partially includes a time period prior to receiving the configuration for radio measurement relaxation. In response to determining that the fulfillment or unfulfillment condition has been met for the TTT period, the wireless device transmits a radio measurement relaxation report to a radio access network, RAN, node indicating that the fulfillment or unfulfillment condition has been met.

The method may further include monitoring a network parameter prior to receiving the configuration for radio measurement relaxation to determine whether the fulfillment condition or unfulfillment condition has been met.

The method may further include, in response to determining that the fulfillment or unfulfillment condition has been met prior to receiving the configuration for radio measurement relaxation, starting a TTT timer that has a duration equal to the TTT period.

The time period prior to receiving the configuration for radio measurement relaxation may include a time period in which the UE was in IDLE or INACTVE state.

Radio measurement relaxation may include radio resource management, RRM, measurement relaxation.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
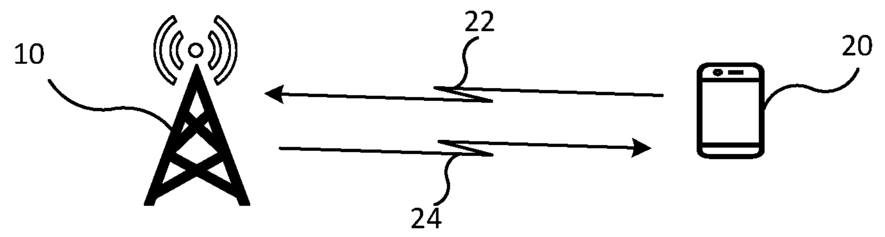
FIG. 1 is a diagram illustrating elements of a radio access network.

Certain aspects of the disclosure and their embodiments may provide solutions to these or other challenges. In particular, some embodiments described herein provide methods to ensure that the UE sends timely indications of fulfillment or radio measurement relaxation criteria/conditions, while avoiding sending unnecessary indications to the network. Some embodiments use various approaches, such as applying a time to trigger for the radio measurement relaxation fulfillment-report, applying a hysteresis for determining when to send the radio measurement relaxation fulfillment-report, avoiding sending a report with the same value as already indicated, avoiding indicating unfulfillment of conditions without having indicated fulfillment earlier, and/or applying a prohibit timer for sending the report.

Certain embodiments may provide one or more of the following technical advantage(s). In particular, by employing one or more such approaches, a UE may send timely reports to the network about radio measurement relaxation criteria/condition fulfillment/unfulfillment, while avoiding sending unnecessary reports.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. In the following description, the term "RRM measurement relaxation" refers to mechanisms which enable a UE to reduce RRM measurements in a specified way or as configured by the network.

There currently exist certain challenge(s) with radio measurement relaxation, and in particular RRM measurement relaxation. For example, a UE may apply RRM measurement relaxation in IDLE mode. While in IDLE mode, the UE may monitor certain conditions, and when the conditions are fulfilled, the UE may apply relaxed radio measurements.

As described above, radio measurement relaxation in CONNECTED mode may be based on a report sent from the UE to the network which indicates that the UE fulfills certain conditions (e.g. that RSRP or RSRQ is above a certain threshold). The network may in response to such a report indicate to the UE that the UE shall apply RRM measurement relaxation in CONNECTED mode. The UE-to-network report for RRM measurement relaxation may be triggered when certain criteria are met for a predetermined period of time. That means that the UE may start to monitor those criteria only upon being configured with such reporting, even if the criteria had been fulfilled for a long time before being configured. Therefore, an opportunity to perform RRM measurement relaxation might be missed, which may cause unnecessary UE power consumption.

According to some embodiments, a UE may consider historical measurements when determining whether to send a report regarding radio measurement relaxation for connected mode. This may, for example, include measurements which the UE performed when the UE was in IDLE mode before entering connected mode. Moreover the measurements may include measurements the UE performed prior to receiving a radio measurement relaxation configuration from the network for sending reports regarding radio measurement relaxation in CONNECTED mode.

Some embodiments described herein may allow a UE to more quickly provide an indication to the network regarding fulfillment of radio measurement relaxation criteria. That in turn may enable the network to configure the UE to apply radio measurement relaxation earlier, and hence may result in more power saving in the UE. Although described primarily in the context of RRM measurement relaxation, it will be understood that the inventive concepts described herein may apply to other types of radio measurement relaxation.

According to some embodiments, a UE may monitor for the conditions for sending an RRM measurement relaxation report while in connected mode and also before entering CONNECTED mode, such as when the UE is in idle or inactive mode. The UE may, upon entering connected mode, determine if the UE should send the report based on the monitoring done in idle or inactive mode.

In some embodiments, the UE may store measurements or information related to measurements when in IDLE or INACTIVE and that data can be used upon entering connected mode to determine whether to send a report to the network about RRM measurement relaxation condition fulfillment.

In prior approaches, the UE would enter connected mode, and then, when the network subsequently configured the UE to perform RRM measurement relaxation reporting, start monitoring RRM measurement relaxation conditions. That would delay the sending of the report until at least the point in time when the network has been able to send the reporting configuration to the UE. The UE would possibly have to wait even longer, since there may be a time-to-trigger behavior associated with sending the report. This means that there may be a delay in sending the report when the UE enters connected mode, even if the UE had been been fulfilling the conditions prior to entering connected mode.

The mechanism for sending the RRM measurement relaxation report may use a time-to-trigger (TTT) timer such that the report is sent to the network only when the conditions have been fulfilled for a meaningful duration of time (rather than triggering the report due to a very short peak in e.g. RSRP/RSRQ). In some embodiments, the UE starts a TTT (or considers the TTT to have been started) already when the UE is in idle or inactive, and when entering connected if the condition has been fulfilled in IDLE or INACTIVE for a predetermined period time (that time may be the same as TTT). Another approach is that the TTT is started with a shorter duration to take in to account the IDLE or INACTIVE time.

Figure 2:
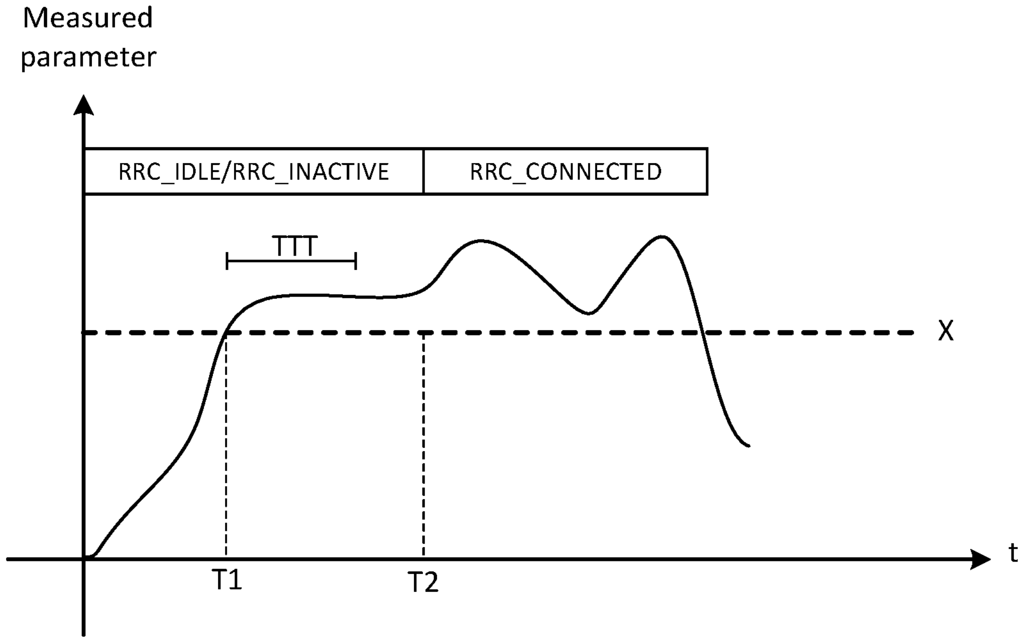
FIGS. 2 to 4 are example graphs of a measured parameter that is used to trigger RRM measurement relaxation reporting as a function of time.

FIG. 2 is an example graph of a measured parameter (e.g., RSRP or RSRQ) that is used to trigger RRM measurement relaxation reporting as a function of time with a time-to-trigger requirement. The sending of an RRM measurement relaxation report may be triggered if the measured parameter exceeds a threshold value (X) and stays above the threshold value for a TTT period. In the example illustrated in FIG. 2, the measured parameter exceeds the threshold value X at a time T1 while the UE is in IDLE or INACTIVE mode and remains above the threshold for more than a TTT time period while the UE is in IDLE or INACTIVE mode. The UE transitions to CONNECTED mode at time T2, at which time the value of the measured parameter still exceeds the threshold value X. The UE may send an RRM measurement relaxation report immediately at time T2 when it enters CONNECTED mode. In these embodiments, the UE may start the TTT timer while it is in IDLE or INACTIVE mode.

Figure 3:
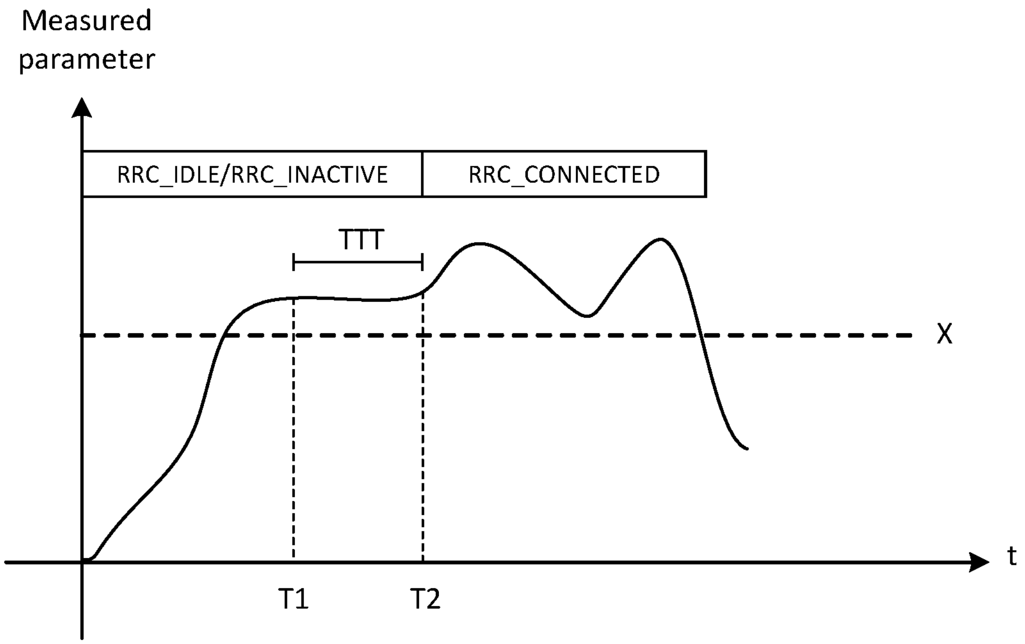

FIG. 3 is an example graph of a measured parameter that is used to trigger RRM measurement relaxation reporting as a function of time with a time-to-trigger requirement according to further embodiments. In the embodiments of FIG. 3, when the UE transitions to CONNECTED mode at time T2, the UE checks historical measurements taken when it was in IDLE or INACTIVE mode and determines that the value of the measured parameter was higher than the threshold X for at least a time period TTT prior to entering CONNECTED mode. The UE may then send an RRM measurement relaxation report immediately at time T2 when it enters CONNECTED mode.

Figure 4:
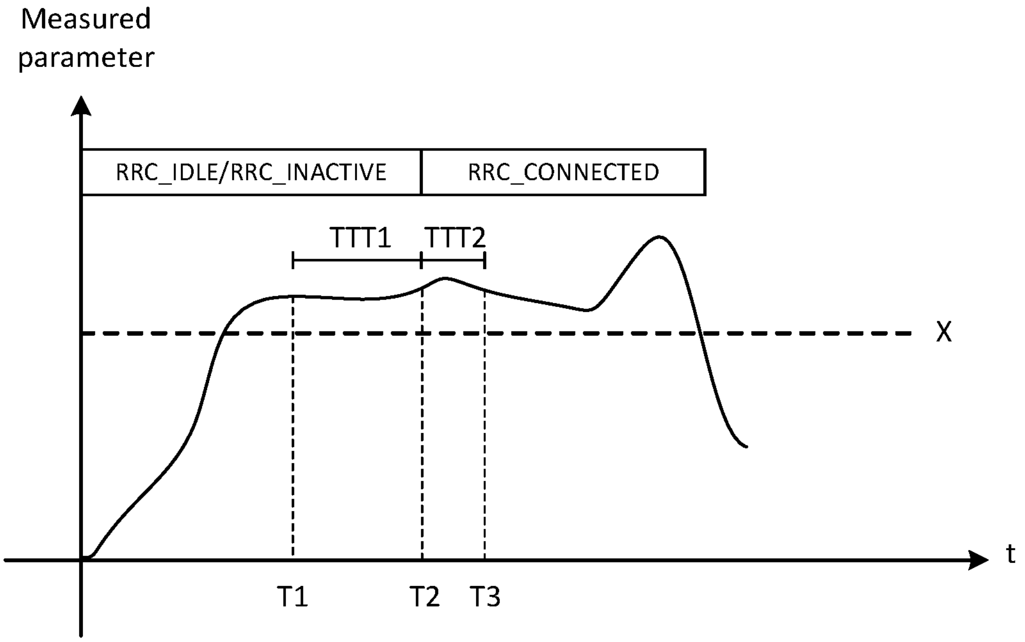

FIG. 4 is an example graph of a measured parameter that is used to trigger RRM measurement relaxation reporting as a function of time with a time-to-trigger requirement according to further embodiments. In the embodiments of FIG. 4, when the UE transitions to CONNECTED mode at time T2, the UE checks historical measurements taken when it was in IDLE or INACTIVE mode and determines that the value of the measured parameter was higher than the threshold X for at least a first time period TTT1 prior to entering CONNECTED mode. Upon entering CONNECTED mode at time T2, the UE starts a timer of duration TTT2. After the expiration of the second time period TTT2 at time T3, the UE may send an RRM measurement relaxation report provided the value of the measured parameter has remained above the threshold X for the duration of the second time period TTT2. The second time period TTT2 may be shorter, longer, or the same length as the first time period TTT1.

Figure 5:
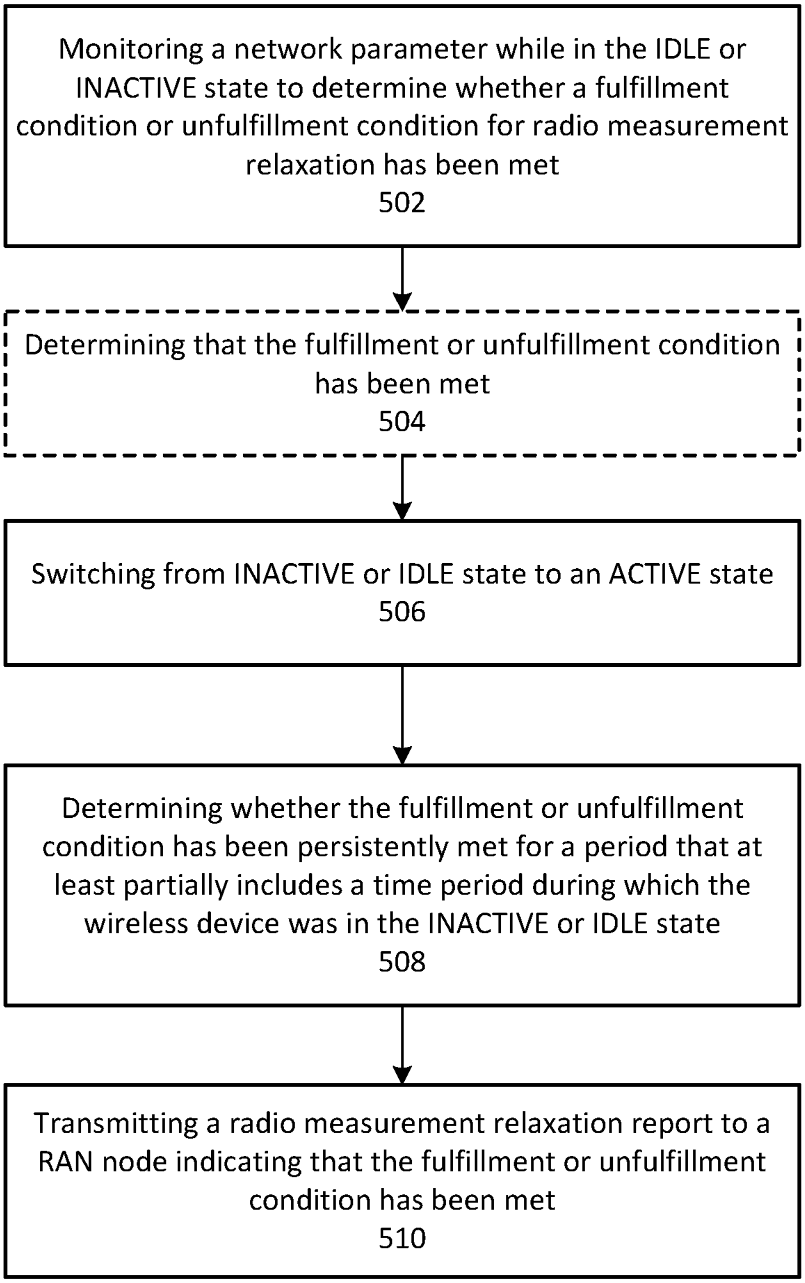
FIG. 5 is a flowchart illustrating operations of wireless devices according to various embodiments.

Operations of a wireless communication device/UE according to some embodiments are illustrated in the flowchart of FIG. 5. Referring to FIG. 5, a method of operating a UE in a communication network is illustrated. The UE monitors (502) a network parameter while in the IDLE or INACTIVE state to determine whether the fulfillment condition or unfulfillment condition has been met. The UE may optionally determine (504) while the UE is in the IDLE or INACTIVE state that the fulfillment or unfulfillment condition has been met. The UE then switches (506) from INACTIVE or IDLE state to an ACTIVE state. After switching to the ACTIVE state, the UE determines (508) whether a fulfillment or unfulfillment condition for radio measurement relaxation has been persistently met for at least a time-to-trigger, TTT, period. The TTT period at least partially includes a time period during which the UE was in the INACTIVE or IDLE state. In response to determining that the fulfillment or unfulfillment condition has been met for the TTT period, the UE transmits (510) an RRM measurement relaxation report to a radio access network, RAN, node indicating that the fulfillment or unfulfillment condition has been met.

The method may include in starting a TTT timer that has a duration equal to the TTT period response to determining that the fulfillment or unfulfillment condition has been met during the IDLE or INACTIVE state.

The fulfillment condition may indicate that the UE is in a state that is suitable for RRM measurement relaxation, and may include a power level and/or quality of a reference signal received by the UE being greater than a threshold value.

The unfulfillment condition may indicate that the UE is in a state that is unsuitable for radio measurement relaxation, and may include a power level and/or quality of a reference signal received by the UE being less than a threshold value.

The method may further include, after switching to ACTIVE state, starting a timer having a timer duration. The radio measurement relaxation report is sent after expiration of the timer. The timer may have a duration different than the TTT period. In some embodiments, the duration of the timer is less than the TTT period.

In some embodiments, the method may include receiving a configuration for radio measurement relaxation after entering ACTIVE state. Determining that the fulfillment or unfulfillment condition has been met for the TTT period is performed in response to receiving the configuration for radio measurement relaxation.

In the embodiments described above, when a UE transitions from IDLE to CONNECTED mode, the UE may consider historical measurements for determining whether the conditions for radio measurement relaxation have been met. For example, the UE may consider measurements performed when it was in IDLE or INACTIVE when it later moves to CONNECTED, and those historical measurements may be used when the UE decides whether to send a report indicating that it has fulfilled radio measurement relaxation conditions.

In other embodiments, a UE which is in CONNECTED mode and subsequently receives a configuration for radio measurement relaxation reporting may consider historical measurements (i.e., measurements made before receiving the configuration) for determining whether the conditions for radio measurement relaxation have been met. That is, the UE may consider measurements performed before the configuration was received when determining whether to send the report or not. The measurements may include measurements taken while the UE was in IDLE or INACTIVE mode, or while the UE was in CONNECTED mode but had not yet become configured for RRM measurement relaxation reporting.

In some embodiments a UE will trigger to send the radio measurement relaxation report in response to being configured with such reporting, if, based on historical measurements, the UE has been fulfilling the conditions even before getting the configuration. For example, assume a UE has been fulfilling the conditions for radio measurement relaxation. If the UE becomes configured for the radio measurement relaxation reporting at time T, the UE may then send a report immediately at time T (or shortly thereafter since some processing time may be required).

Figure 6:
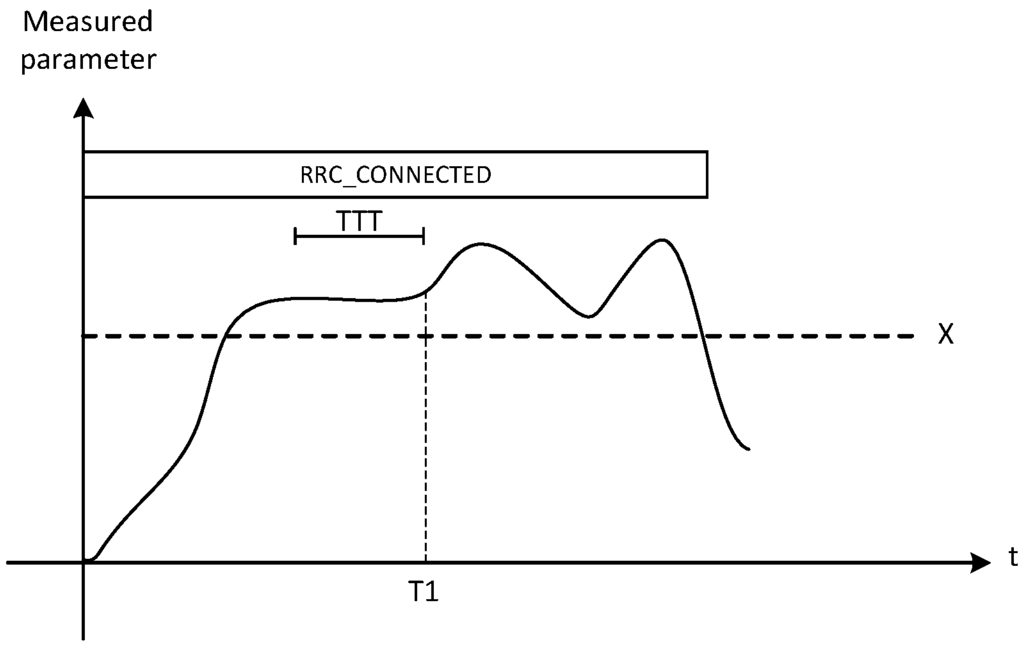
FIGS. 6 to 9 are example graphs of a measured parameter that is used to trigger RRM measurement relaxation reporting as a function of time.

For example, FIG. 6 is an example graph of a measured parameter that is used to trigger RRM measurement relaxation reporting as a function of time according to some embodiments. In the embodiments of FIG. 6, a UE in CONNECTED mode becomes configured for RRM measurement relaxation reporting at time T1. The UE checks historical measurements taken prior to becoming configured for RRM measurement relaxation reporting and determines that the value of the measured parameter was higher than the threshold X for at least a time period TTT prior to becoming configured for RRM measurement relaxation reporting. The UE may then send an RRM measurement relaxation report immediately at time T1 after becoming configured for RRM measurement relaxation reporting.

Figure 7:
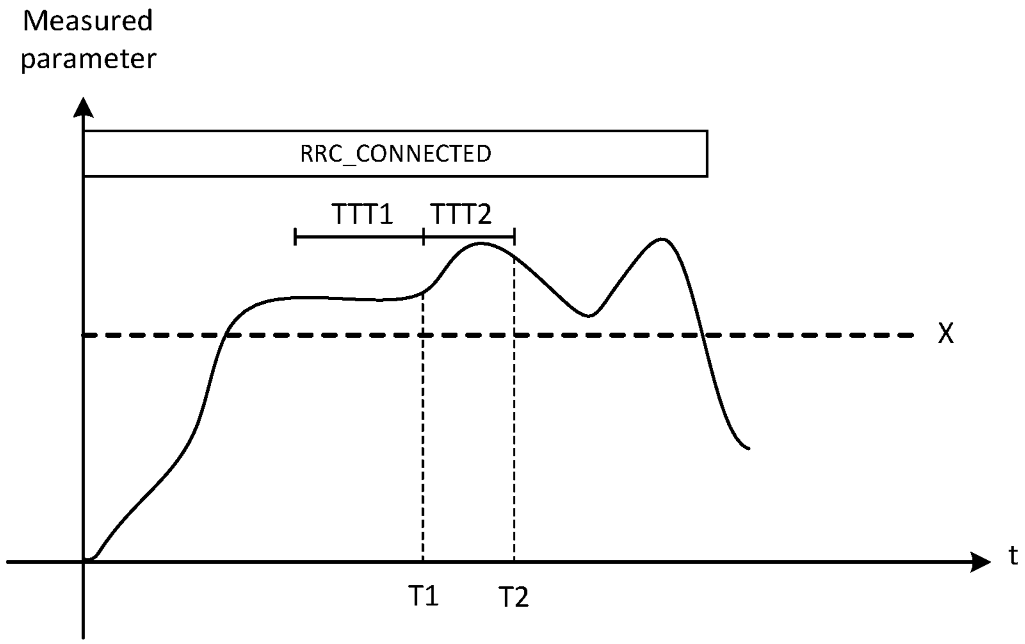

FIG. 7 is an example graph of a measured parameter that is used to trigger RRM measurement relaxation reporting as a function of time according to further embodiments. In the embodiments of FIG. 7, a UE in CONNECTED mode becomes configured for RRM measurement relaxation reporting at time T1. The UE checks historical measurements taken prior to becoming configured for RRM measurement relaxation reporting and determines that the value of the measured parameter was higher than the threshold X for at least a first time period TTT1 prior to becoming configured for RRM measurement relaxation reporting. Upon being configured for RRM measurement relaxation reporting at time T1, the UE starts a timer of duration TTT2.

After the expiration of a second time period TTT2 at time T2, the UE may send an RRM measurement relaxation report provided the value of the measured parameter has remained above the threshold X for the duration of the second time period TTT2. The second time period TTT2 may be shorter, longer, or the same length as the first time period TTT1.

The network may indicate to the UE whether the UE is allowed to consider historical measurements when determining whether or not to send the report. That configuration may be provided to the UE in a message which configures the feature for the UE.

From the perspective of the UE, the UE can take into account the possible use of historical data when it receives an indication or understands the network supports and can configure RRM measurement relaxation as described, or if for example in the past the network has indicated the UE is allowed to consider historical measurements. The UE may, in such cases, store historical data in case the network later configures the use of historical data for the purpose.

In some embodiments, in addition to measurements while in CONNECTED mode taken prior to becoming configured for RRM measurement relaxation reporting for determining whether RRM measurement relaxation conditions have been fulfilled, a UE may consider measurements taken while in IDLE and/or INACTIVE mode taken prior to entering CONNECTED mode and becoming configured for RRM measurement relaxation reporting for determining whether RRM measurement relaxation conditions have been fulfilled.

Figure 8:
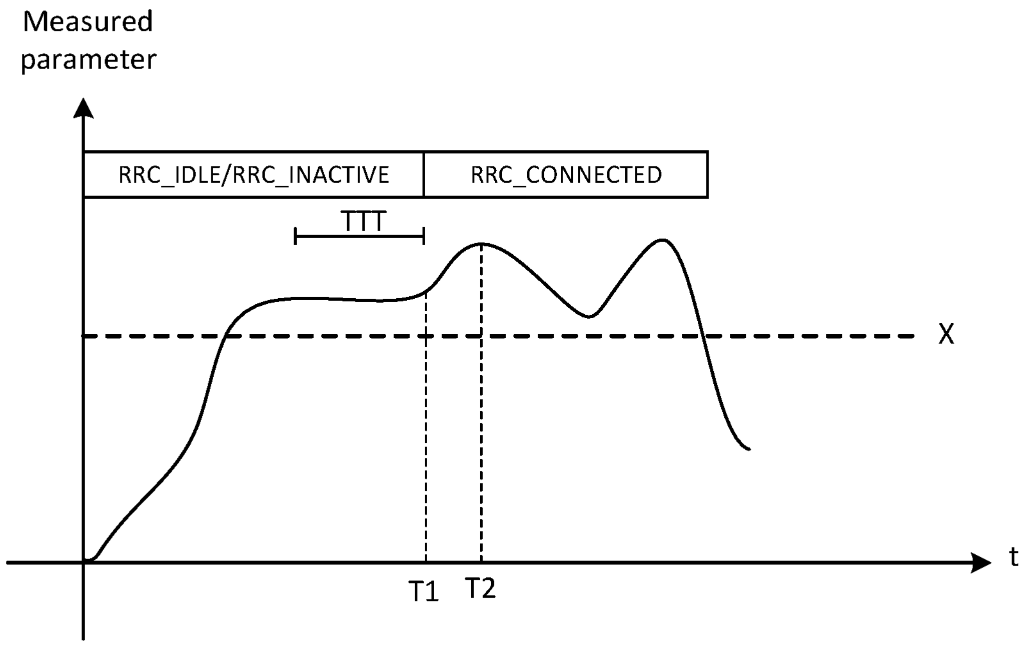

For example, as shown in FIG. 8, a UE in IDLE or INACTIVE mode performs measurements on a measured parameter that is used to determine whether RRM measurement relaxation conditions have been fulfilled. The UE enters CONNECTED mode at time T1 and receives a configuration for RRM measurement relaxation reporting from the network at time T2. When the UE enters connected mode, the UE checks historical measurements taken prior to entering CONNECTED mode and determines that the value of the measured parameter was higher than the threshold X for at least a time period TTT prior to entering CONNECTED mode. The UE may send an RRM measurement relaxation report immediately at time T2 after becoming configured for RRM measurement relaxation reporting, provided the value of the measured parameter remained above the threshold X before becoming configured for RRM measurement relaxation.

Figure 9:
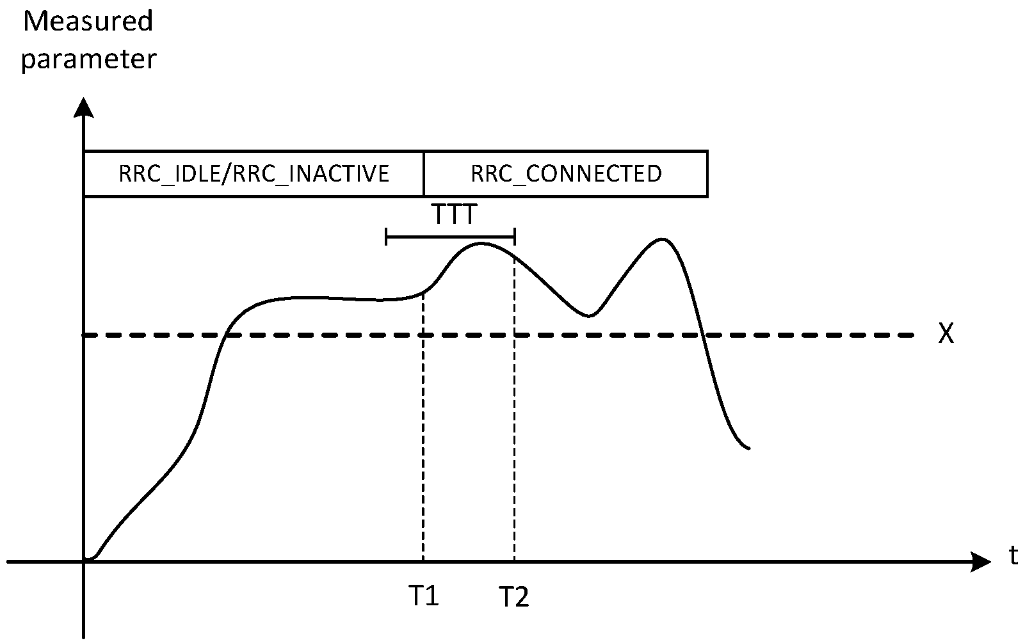

Referring to FIG. 9, a UE in IDLE or INACTIVE mode performs measurements on a measured parameter that is used to determine whether RRM measurement relaxation conditions have been fulfilled. The UE enters CONNECTED mode at time T1 and becomes configured for RRM measurement relaxation reporting at time T2. When the UE becomes configured for RRM measurement relaxation at time T2, the UE checks historical measurements taken prior to becoming configured for RRM measurement relaxation and determines that the value of the measured parameter was higher than the threshold X for at least a time period TTT prior becoming configured for RRM measurement relaxation, which includes measurements taken while the UE was in IDLE or INACTIVE mode. The UE may then send an RRM measurement relaxation report immediately at time T2 after becoming configured for RRM measurement relaxation reporting.

Figure 10:
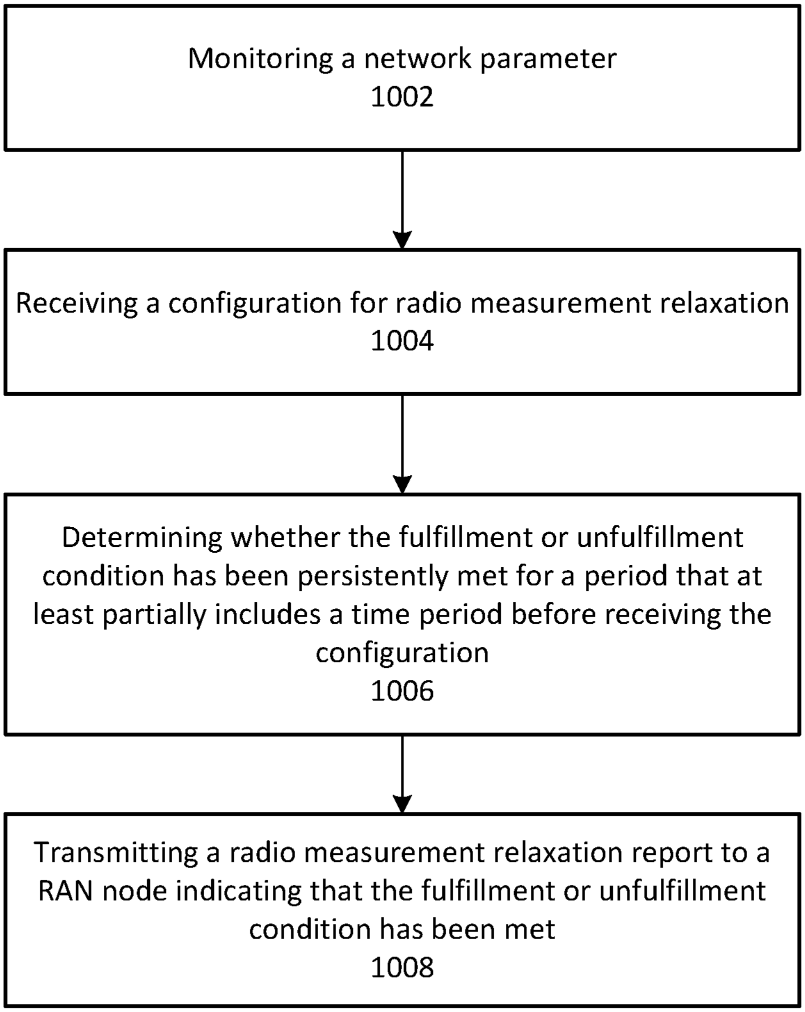
FIG. 10 is a flowchart illustrating operations of wireless devices according to various embodiments.

Operations of a wireless communication device/UE according to some embodiments are illustrated in the flow-chart of FIG. 10.

Referring to FIG. 10, method of operating a UE in a communication network is illustrated. The UE monitors (1002) a network parameter prior to receiving a configuration for radio measurement relaxation to determine whether a fulfillment condition or unfulfillment condition for radio measurement relaxation has been met. While in an ACTIVE state, the UE receives (1004) a configuration for radio measurement relaxation. The UE determines (1006) whether a fulfillment or unfulfillment condition for radio measurement relaxation has been persistently met for at least a time-to-trigger, TTT, period, where the TTT period at least partially includes a time period prior to receiving the configuration for radio measurement relaxation. In response to determining that the fulfillment or unfulfillment condition has been met for the TTT period, the UE transmits (1008) a radio measurement relaxation report to a radio access network, RAN, node (10) indicating that the fulfillment or unfulfillment condition has been met.

The method may further include starting a TTT timer that has a duration equal to the TTT period in response to determining that the fulfillment or unfulfillment condition has been met prior to receiving the configuration for radio measurement relaxation.

The method may further include starting a timer having a timer duration after receiving the configuration for radio measurement relaxation. The radio measurement relaxation report is sent after expiration of the timer. The timer may have a duration different than the TTT period. In some embodiments, the duration of the timer is less than the TTT period.

In some embodiments, the time period prior to receiving the configuration for radio measurement relaxation includes a time period in which the UE was in IDLE or INACTVE state.

A UE may send the report which indicates to the network that the UE has fulfilled radio measurement relaxation conditions in a "UE assistance information" message. However, other approaches may also be used.

For example, one approach is to send the report in an RRC message during the RRC setup procedure or the RRC resume procedure. Such a report is referred to herein as an early indication. The early indication may for example be sent in an RRCSetupRequest, RRCSetupComplete, RRCResumeRequest or RRCResumeComplete message. The early indication may be implemented by a flag set to a certain value to indicate the early indication, or a flag which is present to indicate the early indication.

In some embodiments a UE may send an early indication only if the network explicitly indicates that the UE is allowed to do so. The network may indicate whether it is allowed for example by sending an indication in system information, for example a flag in broadcast or dedicated system information and/or sending an indication to the UE before the UE went to IDLE or INACTIVE, for example in a configuration message which configured CONNECTED mode radio measurement relaxation reporting last time the UE were in CONNECTED.

Another approach is that the UE may consider itself to be allowed to send the indication the presence of some other fields an implicit indication. For example, the UE may consider that it can send the indication if the network configures thresholds related to an IDLE or INACTIVE mode radio measurement relaxation feature in broadcast system information or in dedicated UE configuration e.g. in other RRC signaling.

Figure 11:
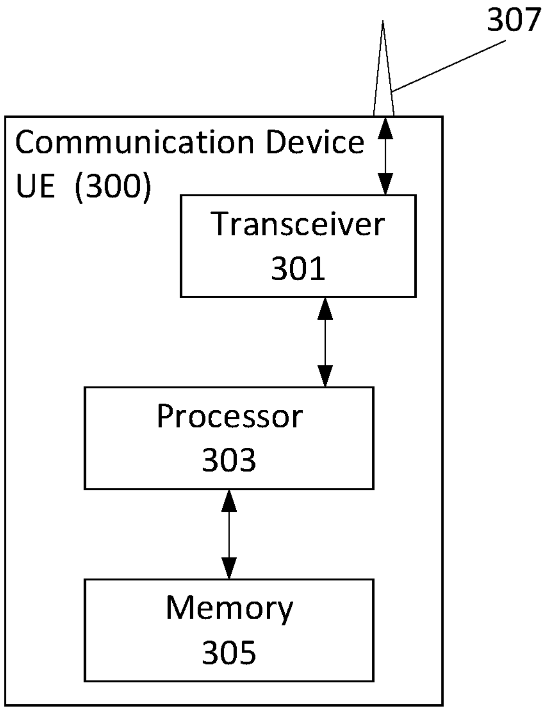
FIG. 11 is a block diagram illustrating a wireless device UE according to some embodiments of inventive concepts.

FIG. 11 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device 122 of FIG. 12 and/or UE 1300 of FIG. 13. As shown, communication device UE may include an antenna 307 (e.g., corresponding to antenna 1322 of FIG. 13), and transceiver circuitry 301 (also referred to as a transceiver, e.g., corresponding to interface 1312 of FIG. 13) including a transmitter and a receiver configured to provide uplink and downlink radio communications with a base station(s) (e.g., corresponding to network node 1210A of FIG. 12, also referred to as a RAN node) of a radio access network. Communication device UE may also include processing circuitry 303 (also referred to as a processor, e.g., corresponding to processing circuitry 1302 of FIG. 13) coupled to the transceiver circuitry, and memory circuitry 305 (also referred to as memory, e.g., corresponding to device readable medium 1310 of FIG. 13) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 12:
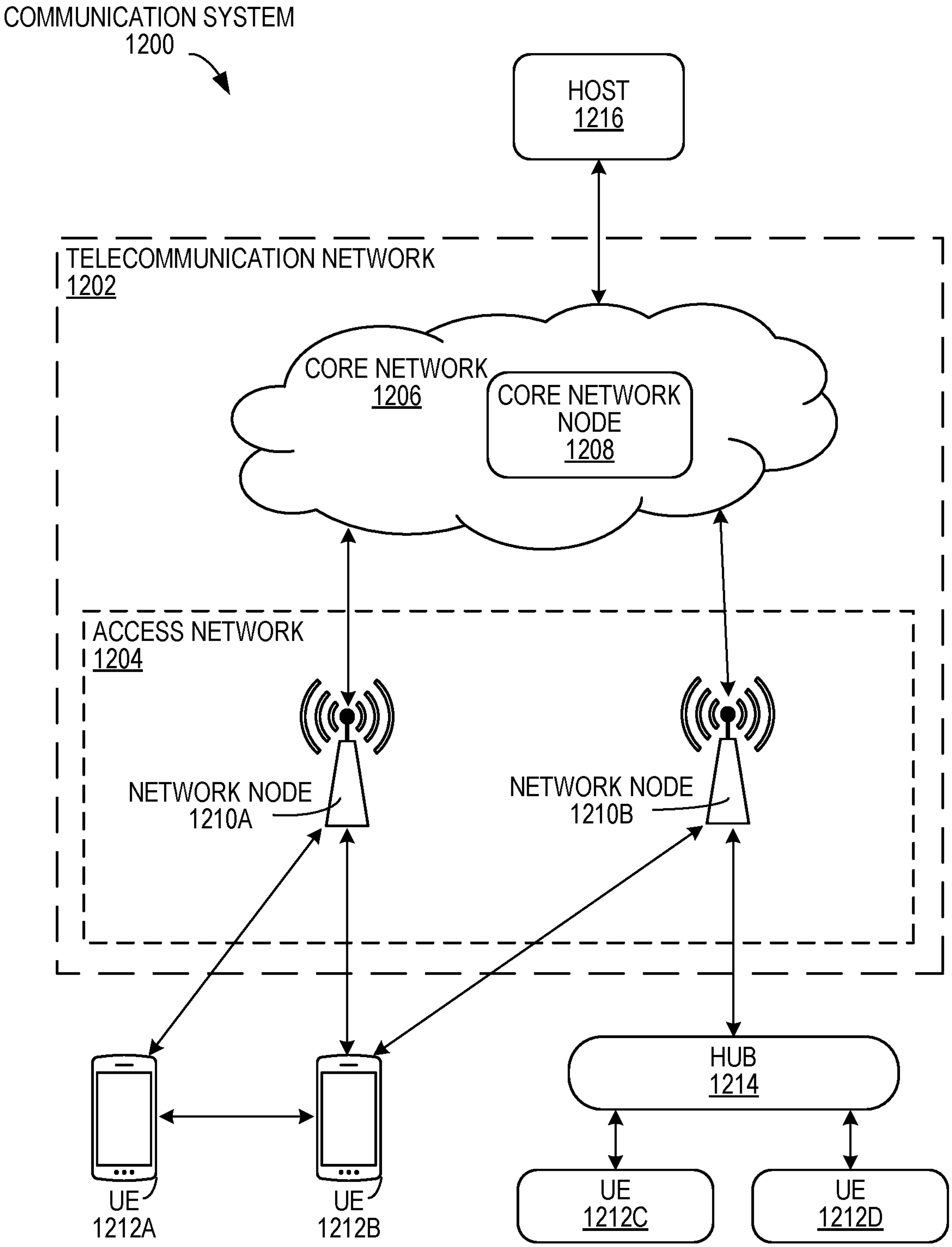
FIG. 12 is a block diagram of a communication system in accordance with some embodiments.

FIG. 12 shows an example of a communication system 1200 in accordance with some embodiments.

In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210*a* and 1210*b* (one or more of which may be generally referred to as network nodes 1210), or any other similar 3rd Generation Partnership Project (3GPP) access node or non-3GPP access point. The network nodes 1210 facilitate direct or indirect connection of user equipment (UE), such as by connecting UEs 1212*a*, 1212*b*, 1212*c*, and 1212*d* (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 12 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212*c* and/or 1212*d*) and network nodes (e.g., network node 1210*b*). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210*b*. The hub 1214 may also allow for a different communication scheme and/or schedule between the hub 1214 and UEs (e.g., UE 1212*c* and/or 1212*d*), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210*b*. In other embodiments, the hub 1214 may be a non-dedicated hub—that is, a device which is capable of operating to route communications between the UEs and network node 1210*b*, but which is additionally capable of operating as a communication start and/or end point for certain data channels.

Figure 13:
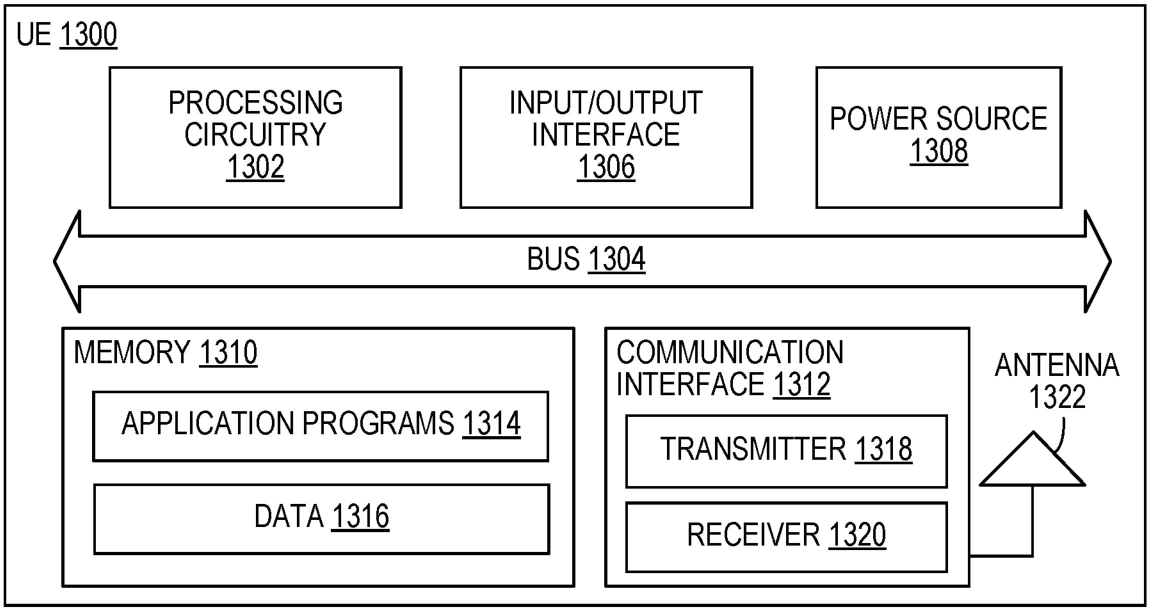
FIG. 13 is a block diagram of a user equipment in accordance with some embodiments

FIG. 13 shows a UE 1300 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1300 includes processing circuitry 1302 that is operatively coupled via a bus 1304 to an input/output interface 1306, a power source 1308, a memory 1310, a communication interface 1312, and/or any other component, or any combination thereof. Certain UEs may utilize all or a subset of the components shown in FIG. 13. The level of integration between the components may vary from one UE to another UE. Further, certain UEs may contain multiple instances of a component, such as multiple processors, memories, transceivers, transmitters, receivers, etc.

The processing circuitry 1302 is configured to process instructions and data and may be configured to implement any sequential state machine operative to execute instructions stored as machine-readable computer programs in the memory 1310. The processing circuitry 1302 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1302 may include multiple central processing units (CPUs).

In the example, the input/output interface 1306 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1300. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1308 is structured as a battery or battery pack. Other types of power sources, such as an external power source (e.g., an electricity outlet), photovoltaic device, or power cell, may be used. The power source 1308 may further include power circuitry for delivering power from the power source 1308 itself, and/or an external power source, to the various parts of the UE 1300 via input circuitry or an interface such as an electrical power cable. Delivering power may be, for example, for charging of the power source 1308. Power circuitry may perform any formatting, converting, or other modification to the power from the power source 1308 to make the power suitable for the respective components of the UE 1300 to which power is supplied.

The memory 1310 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1310 includes one or more application programs 1314, such as an operating system, web browser application, a widget, gadget engine, or other application, and corresponding data 1316. The memory 1310 may store, for use by the UE 1300, any of a variety of various operating systems or combinations of operating systems.

The memory 1310 may be configured to include a number of physical drive units, such as redundant array of independent disks (RAID), flash memory, USB flash drive, external hard disk drive, thumb drive, pen drive, key drive, highdensity digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1310 may allow the UE 1300 to access instructions, application programs and the like, stored on transitory or non-transitory memory media, to off-load data, or to upload data. An article of manufacture, such as one utilizing a communication system may be tangibly embodied as or in the memory 1310, which may be or comprise a device-readable storage medium.

The processing circuitry 1302 may be configured to communicate with an access network or other network using the communication interface 1312. The communication interface 1312 may comprise one or more communication subsystems and may include or be communicatively coupled to an antenna 1322. The communication interface 1312 may include one or more transceivers used to communicate, such as by communicating with one or more remote transceivers of another device capable of wireless communication (e.g., another UE or a network node in an access network). Each transceiver may include a transmitter 1318 and/or a receiver 1320 appropriate to provide network communications (e.g., optical, electrical, frequency allocations, and so forth). Moreover, the transmitter 1318 and receiver 1320 may be coupled to one or more antennas (e.g., antenna 1322) and may share circuit components, software or firmware, or alternatively be implemented separately.

In the illustrated embodiment, communication functions of the communication interface 1312 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1312, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1300 shown in FIG. 13.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 14:
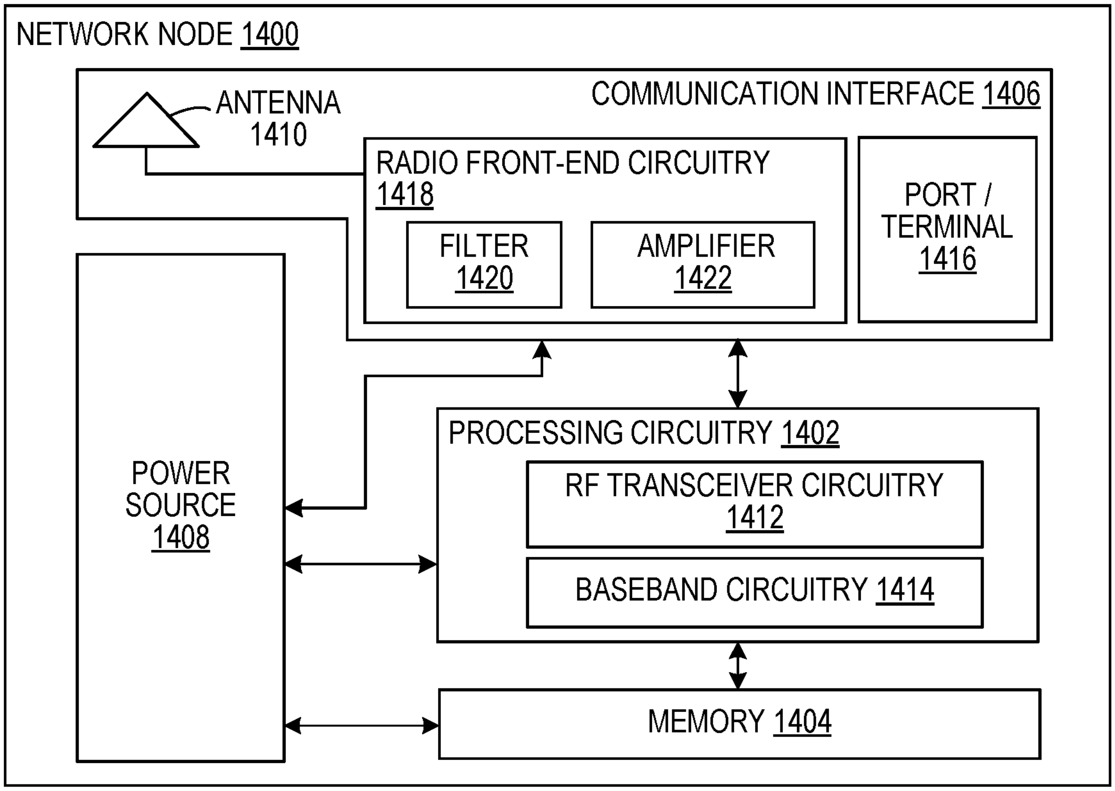
FIG. 14 is a block diagram of a network node in accordance with some embodiments.

FIG. 14 shows a network node 1400 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1400 includes a processing circuitry 1402, a memory 1404, a communication interface 1406, and a power source 1408. The network node 1400 may be composed of multiple physically separate components (e.g., a NodeB component and a RNC component, or a BTS component and a BSC component, etc.), which may each have their own respective components. In certain scenarios in which the network node 1400 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1400 may be configured to support multiple radio access technologies (RATs). In such embodiments, some components may be duplicated (e.g., separate memory 1404 for different RATs) and some components may be reused (e.g., a same antenna 1410 may be shared by different RATs). The network node 1400 may also include multiple sets of the various illustrated components for different wireless technologies integrated into network node 1400, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1400.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1400 components, such as the memory 1404, to provide network node 1400 functionality.

In some embodiments, the processing circuitry 1402 includes a system on a chip (SOC). In some embodiments, the processing circuitry 1402 includes one or more of radio frequency (RF) transceiver circuitry 1412 and baseband processing circuitry 1414. In some embodiments, the radio frequency (RF) transceiver circuitry 1412 and the baseband processing circuitry 1414 may be on separate chips (or sets of chips), boards, or units, such as radio units and digital units. In alternative embodiments, part or all of RF transceiver circuitry 1412 and baseband processing circuitry 1414 may be on the same chip or set of chips, boards, or units.

The memory 1404 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the network node 1400. The memory 1404 may be used to store any calculations made by the processing circuitry 1402 and/or any data received via the communication interface 1406. In some embodiments, the processing circuitry 1402 and memory 1404 is integrated.

The communication interface 1406 is used in wired or wireless communication of signaling and/or data between a network node, access network, and/or UE. As illustrated, the communication interface 1406 comprises port(s)/terminal(s) 1416 to send and receive data, for example to and from a network over a wired connection. The communication interface 1406 also includes radio front-end circuitry 1418 that may be coupled to, or in certain embodiments a part of, the antenna 1410. Radio front-end circuitry 1418 comprises filters 1420 and amplifiers 1422. The radio front-end circuitry 1418 may be connected to an antenna 1410 and processing circuitry 1402. The radio front-end circuitry may be configured to condition signals communicated between antenna 1410 and processing circuitry 1402. The radio front-end circuitry 1418 may receive digital data that is to be sent out to other network nodes or UEs via a wireless connection. The radio front-end circuitry 1418 may convert the digital data into a radio signal having the appropriate channel and bandwidth parameters using a combination of filters 1420 and/or amplifiers 1422. The radio signal may then be transmitted via the antenna 1410. Similarly, when receiving data, the antenna 1410 may collect radio signals which are then converted into digital data by the radio front-end circuitry 1418. The digital data may be passed to the processing circuitry 1402. In other embodiments, the communication interface may comprise different components and/or different combinations of components.

In certain alternative embodiments, the network node 1400 does not include separate radio front-end circuitry 1418, instead, the processing circuitry 1402 includes radio front-end circuitry and is connected to the antenna 1410. Similarly, in some embodiments, all or some of the RF transceiver circuitry 1412 is part of the communication interface 1406. In still other embodiments, the communication interface 1406 includes one or more ports or terminals 1416, the radio front-end circuitry 1418, and the RF transceiver circuitry 1412, as part of a radio unit (not shown), and the communication interface 1406 communicates with the baseband processing circuitry 1414, which is part of a digital unit (not shown).

The antenna 1410 may include one or more antennas, or antenna arrays, configured to send and/or receive wireless signals. The antenna 1410 may be coupled to the radio front-end circuitry 1418 and may be any type of antenna capable of transmitting and receiving data and/or signals wirelessly. In certain embodiments, the antenna 1410 is separate from the network node 1400 and connectable to the network node 1400 through an interface or port.

The antenna 1410, communication interface 1406, and/or the processing circuitry 1402 may be configured to perform any receiving operations and/or certain obtaining operations described herein as being performed by the network node. Any information, data and/or signals may be received from a UE, another network node and/or any other network equipment. Similarly, the antenna 1410, the communication interface 1406, and/or the processing circuitry 1402 may be configured to perform any transmitting operations described herein as being performed by the network node. Any information, data and/or signals may be transmitted to a UE, another network node and/or any other network equipment.

The power source 1408 provides power to the various components of network node 1400 in a form suitable for the respective components (e.g., at a voltage and current level needed for each respective component). The power source 1408 may further comprise, or be coupled to, power management circuitry to supply the components of the network node 1400 with power for performing the functionality described herein. For example, the network node 1400 may be connectable to an external power source (e.g., the power grid, an electricity outlet) via an input circuitry or interface such as an electrical cable, whereby the external power source supplies power to power circuitry of the power source 1408. As a further example, the power source 1408 may comprise a source of power in the form of a battery or battery pack which is connected to, or integrated in, power circuitry. The battery may provide backup power should the external power source fail.

Embodiments of the network node 1400 may include additional components beyond those shown in FIG. 14 for providing certain aspects of the network node's functionality, including any of the functionality described herein and/or any functionality necessary to support the subject matter described herein. For example, the network node 1400 may include user interface equipment to allow input of information into the network node 1400 and to allow output of information from the network node 1400. This may allow a user to perform diagnostic, maintenance, repair, and other administrative functions for the network node 1400.

Figure 15:
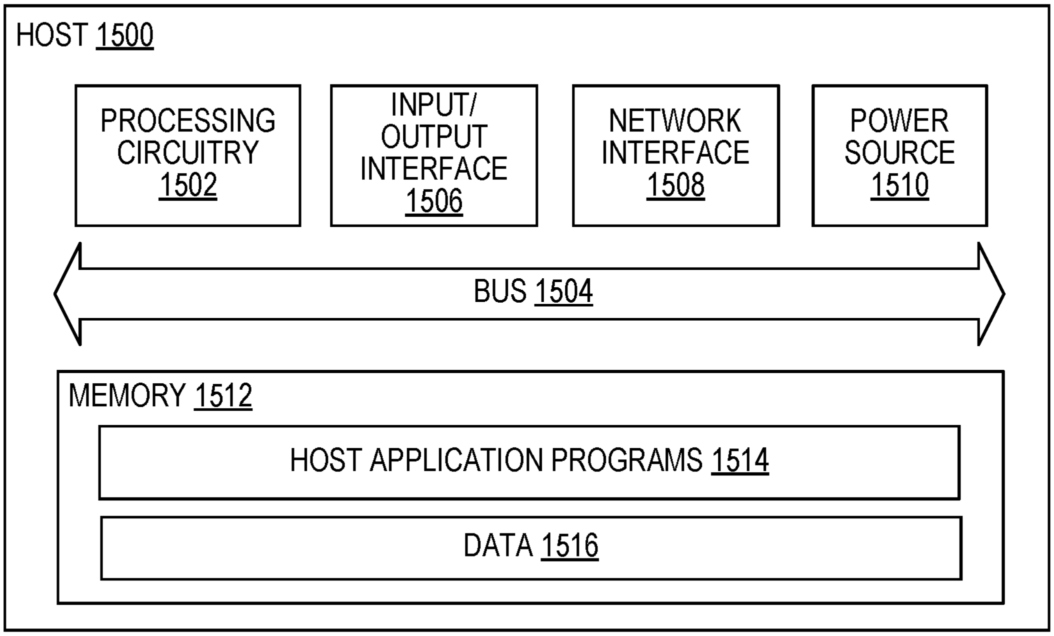
FIG. 15 is a block diagram of a host computer communicating with a user equipment in accordance with some embodiments.

FIG. 15 is a block diagram of a host 1500, which may be an embodiment of the host 1216 of FIG. 12, in accordance with various aspects described herein. As used herein, the host 1500 may be or comprise various combinations hardware and/or software, including a standalone server, a blade server, a cloud-implemented server, a distributed server, a virtual machine, container, or processing resources in a server farm. The host 1500 may provide one or more services to one or more UEs.

The host 1500 includes processing circuitry 1502 that is operatively coupled via a bus 1504 to an input/output interface 1506, a network interface 1508, a power source 1510, and a memory 1512. Other components may be included in other embodiments. Features of these components may be substantially similar to those described with respect to the devices of previous figures, such as FIGS. 13 and 14, such that the descriptions thereof are generally applicable to the corresponding components of host 1500.

The memory 1512 may include one or more computer programs including one or more host application programs 1514 and data 1516, which may include user data, e.g., data generated by a UE for the host 1500 or data generated by the host 1500 for a UE. Embodiments of the host 1500 may utilize only a subset or all of the components shown. The host application programs 1514 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1514 may also provide for user authentication and licensing checks and may periodically report health, routes, and content availability to a central node, such as a device in or on the edge of a core network. Accordingly, the host 1500 may select and/or indicate a different host for over-the-top services for a UE. The host application programs 1514 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 16:
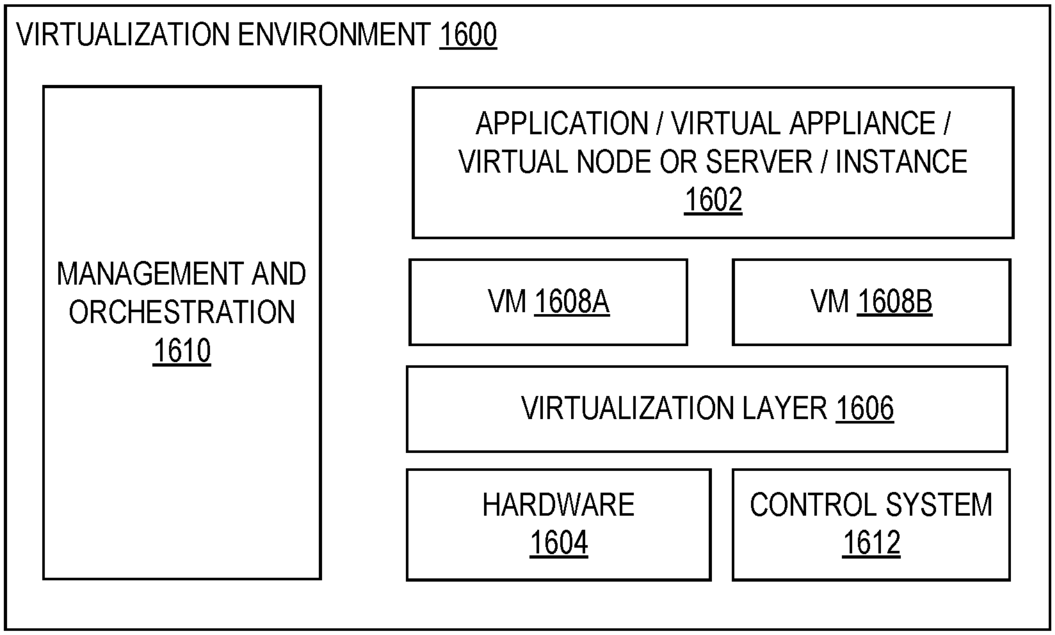
FIG. 16 is a block diagram of a virtualization environment in accordance with some embodiments.

FIG. 16 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VMs **1608*a* and 1608*b* (one or more of which may be generally referred to as VMs 1608), and/or perform any of the functions, features and/or benefits described in relation with some embodiments described herein. The virtualization layer 1606 may present a virtual operating platform that appears like networking hardware to the VMs 1608**.

The VMs 1608 comprise virtual processing, virtual memory, virtual networking or interface and virtual storage, and may be run by a corresponding virtualization layer 1606. Different embodiments of the instance of a virtual appliance 1602 may be implemented on one or more of VMs 1608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608 may be a software implementation of a physical machine that runs programs as if they were executing on a physical, non-virtualized machine. Each of the VMs 1608, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1608 on top of the hardware 1604 and corresponds to the application 1602.

Hardware 1604 may be implemented in a standalone network node with generic or specific components. Hardware 1604 may implement some functions via virtualization. Alternatively, hardware 1604 may be part of a larger cluster of hardware (e.g. such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

Figure 17:
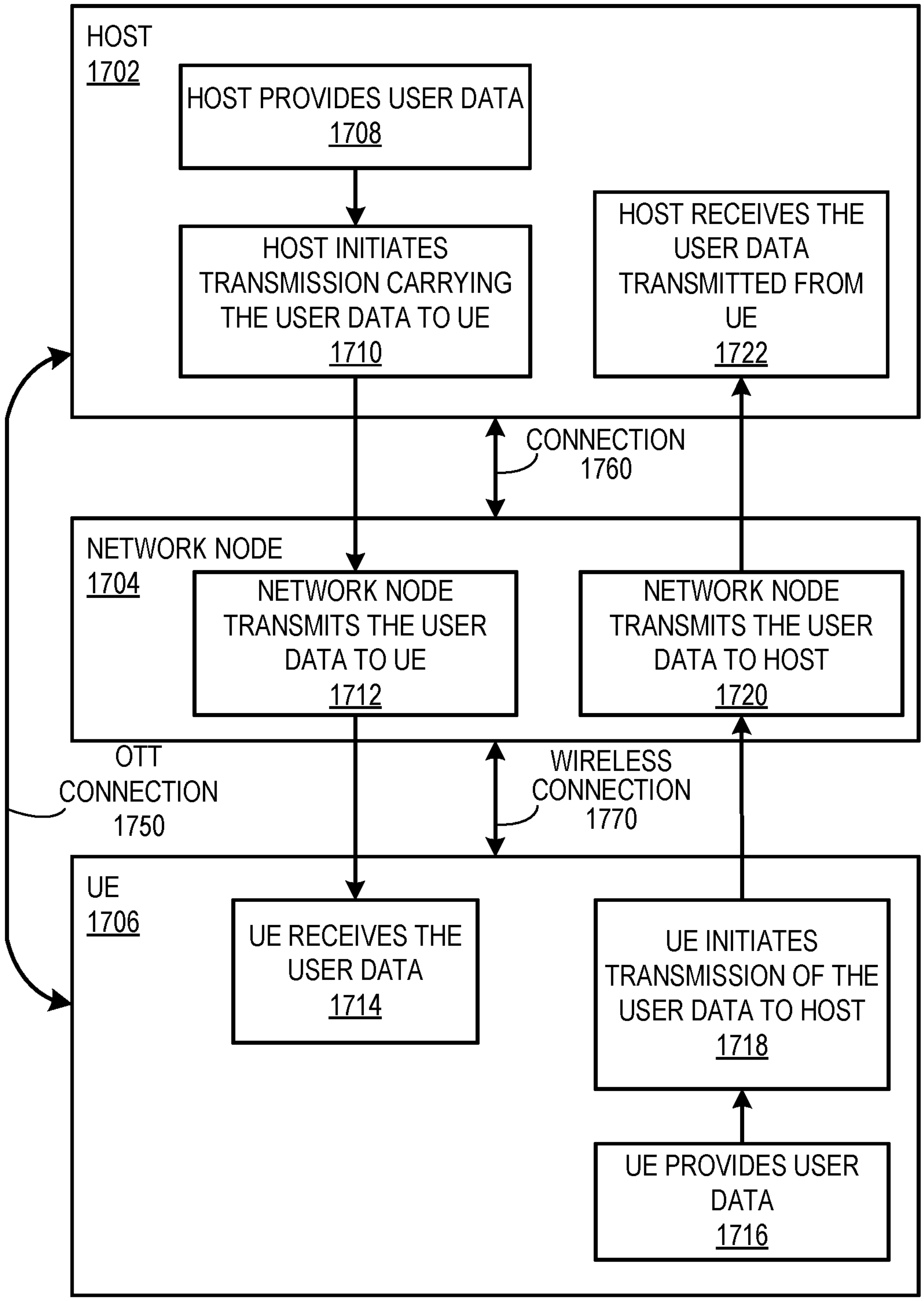
FIG. 17 is a block diagram of a host computer communicating via a base station with a user equipment over a partially wireless connection in accordance with some embodiments in accordance with some embodiments.

FIG. 17 shows a communication diagram of a host 1702 communicating via a network node 1704 with a UE 1706 over a partially wireless connection in accordance with some embodiments. Example implementations, in accordance with various embodiments, of the UE (such as a UE 1212*a* of FIG. 12 and/or UE 1300 of FIG. 13), network node (such as network node 1210*a* of FIG. 12 and/or network node 1400 of FIG. 14), and host (such as host 1216 of FIG. 12 and/or host 1500 of FIG. 15) discussed in the preceding paragraphs will now be described with reference to FIG. 17.

Like host 1500, embodiments of host 1702 include hardware, such as a communication interface, processing circuitry, and memory. The host 1702 also includes software, which is stored in or accessible by the host 1702 and executable by the processing circuitry. The software includes a host application that may be operable to provide a service to a remote user, such as the UE 1706 connecting via an over-the-top (OTT) connection 1750 extending between the UE 1706 and host 1702. In providing the service to the remote user, a host application may provide user data which is transmitted using the OTT connection 1750.

The network node 1704 includes hardware enabling it to communicate with the host 1702 and UE 1706. The connection 1760 may be direct or pass through a core network (like core network 1206 of FIG. 12) and/or one or more other intermediate networks, such as one or more public, private, or hosted networks. For example, an intermediate network may be a backbone network or the Internet.

The UE 1706 includes hardware and software, which is stored in or accessible by UE 1706 and executable by the UE's processing circuitry. The software includes a client application, such as a web browser or operator-specific "app" that may be operable to provide a service to a human or non-human user via UE 1706 with the support of the host 1702. In the host 1702, an executing host application may communicate with the executing client application via the OTT connection 1750 terminating at the UE 1706 and host 1702. In providing the service to the user, the UE's client application may receive request data from the host's host application and provide user data in response to the request data. The OTT connection 1750 may transfer both the request data and the user data. The UE's client application may interact with the user to generate the user data that it provides to the host application through the OTT connection 1750.

The OTT connection 1750 may extend via a connection 1760 between the host 1702 and the network node 1704 and via a wireless connection 1770 between the network node 1704 and the UE 1706 to provide the connection between the host 1702 and the UE 1706. The connection 1760 and wireless connection 1770, over which the OTT connection 1750 may be provided, have been drawn abstractly to illustrate the communication between the host 1702 and the UE 1706 via the network node 1704, without explicit reference to any intermediary devices and the precise routing of messages via these devices.

As an example of transmitting data via the OTT connection 1750, in step 1708, the host 1702 provides user data, which may be performed by executing a host application. In some embodiments, the user data is associated with a particular human user interacting with the UE 1706. In other embodiments, the user data is associated with a UE 1706 that shares data with the host 1702 without explicit human interaction. In step 1710, the host 1702 initiates a transmission carrying the user data towards the UE 1706. The host 1702 may initiate the transmission responsive to a request transmitted by the UE 1706. The request may be caused by human interaction with the UE 1706 or by operation of the client application executing on the UE 1706. The transmission may pass via the network node 1704, in accordance with the teachings of the embodiments described throughout this disclosure. Accordingly, in step 1712, the network node 1704 transmits to the UE 1706 the user data that was carried in the transmission that the host 1702 initiated, in accordance with the teachings of the embodiments described throughout this disclosure. In step 1714, the UE 1706 receives the user data carried in the transmission, which may be performed by a client application executed on the UE 1706 associated with the host application executed by the host 1702.

In some examples, the UE 1706 executes a client application which provides user data to the host 1702. The user data may be provided in reaction or response to the data received from the host 1702. Accordingly, in step 1716, the UE 1706 may provide user data, which may be performed by executing the client application. In providing the user data, the client application may further consider user input received from the user via an input/output interface of the UE 1706. Regardless of the specific manner in which the user data was provided, the UE 1706 initiates, in step 1718, transmission of the user data towards the host 1702 via the network node 1704. In step 1720, in accordance with the teachings of the embodiments described throughout this disclosure, the network node 1704 receives user data from the UE 1706 and initiates transmission of the received user data towards the host 1702. In step 1722, the host 1702 receives the user data carried in the transmission initiated by the UE 1706.

One or more of the various embodiments improve the performance of OTT services provided to the UE 1706 using the OTT connection 1750, in which the wireless connection 1770 forms the last segment. More precisely, the teachings of these embodiments may improve the power and/or resource consumption of a UE and thereby provide benefits such as increased battery life, reduced network utilization, and/or increased network capacity among others.

In an example scenario, factory status information may be collected and analyzed by the host 1702. As another example, the host 1702 may process audio and video data which may have been retrieved from a UE for use in creating maps. As another example, the host 1702 may collect and analyze real-time data to assist in controlling vehicle congestion (e.g., controlling traffic lights). As another example, the host 1702 may store surveillance video uploaded by a UE. As another example, the host 1702 may store or control access to media content such as video, audio, VR or AR which it can broadcast, multicast or unicast to UEs. As other examples, the host 1702 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1750 between the host 1702 and UE 1706, in response to variations in the measurement results. The measurement procedure and/or the network functionality for reconfiguring the OTT connection may be implemented in software and hardware of the host 1702 and/or UE 1706. In some embodiments, sensors (not shown) may be deployed in or in association with other devices through which the OTT connection 1750 passes; the sensors may participate in the measurement procedure by supplying values of the monitored quantities exemplified above, or supplying values of other physical quantities from which software may compute or estimate the monitored quantities. The reconfiguring of the OTT connection 1750 may include message format, retransmission settings, preferred routing etc.; the reconfiguring need not directly alter the operation of the network node 1704. Such procedures and functionalities may be known and practiced in the art. In certain embodiments, measurements may involve proprietary UE signaling that facilitates measurements of throughput, propagation times, latency and the like, by the host 1702. The measurements may be implemented in that software causes messages to be transmitted, in particular empty or 'dummy' messages, using the OTT connection 1750 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless device in a communication network, comprising:

switching the wireless device from an INACTIVE or IDLE state to an ACTIVE state;

after switching to the ACTIVE state, determining by the wireless device whether a fulfillment or unfulfillment condition for radio measurement relaxation has been persistently met for at least a time-to-trigger (TTT) period, wherein the TTT period at least partially includes a time period during which the wireless device was in the INACTIVE or IDLE state;

after switching to the ACTIVE state, starting a timer having a timer duration; and in response to determining that the fulfillment or unfulfillment condition has been met for the TTT period, transmitting a radio measurement relaxation report from the wireless device to a radio access network (RAN) node indicating that the fulfillment or unfulfillment condition has been met, wherein the radio measurement relaxation report is sent after expiration of the timer.

2. The method of claim 1, further comprising:

monitoring a network parameter while in the IDLE or INACTIVE state to determine whether the fulfillment condition or unfulfillment condition has been met; and determining while the wireless device is in the IDLE or INACTIVE state that the fulfillment or unfulfillment condition has been met.

3. The method of claim 2, further comprising:

in response to determining that the fulfillment or unfulfillment condition has been met during the IDLE or INACTIVE state, starting a TTT timer that has a duration equal to the TTT period.

4. The method of claim 1, wherein the fulfillment condition indicates that the wireless device is in a state that is suitable for radio measurement relaxation.

5. The method of claim 4, wherein the fulfillment condition comprises a power level and/or quality of a reference signal received by the wireless device being greater than a threshold value.

6. The method of claim 1, wherein the unfulfillment condition indicates that the wireless device is in a state that is unsuitable for radio measurement relaxation.

7. The method of claim 6, wherein the unfulfillment condition comprises a power level and/or quality of a reference signal received by the wireless device being less than a threshold value.

8. The method of claim 1, wherein the timer has a duration different than the TTT period.

9. The method of claim 8, wherein the duration of the timer is less than the TTT period.

10. A wireless device comprising:

processing circuitry; and memory coupled with the processing circuitry, wherein the memory includes instructions that when executed by the processing circuitry cause the wireless device to perform operations to:

switch the wireless device from an INACTIVE or IDLE state to an ACTIVE state;

after switching to the ACTIVE state, determine by the wireless device whether a fulfillment or unfulfillment condition for radio measurement relaxation has been persistently met for at least a time-to-trigger (TTT) period, wherein the TTT period at least partially includes a time period during which the wireless device was in the INACTIVE or IDLE state;

after switching to the ACTIVE state, starting a timer having a timer duration; and in response to determining that the fulfillment or unfulfillment condition has been met for the TTT period, transmit a radio measurement relaxation report from the wireless device to a radio access network (RAN) node indicating that the fulfillment or unfulfillment condition has been met, wherein the radio measurement relaxation report is sent after expiration of the timer.

11. A computer program product comprising a non-transitory storage medium including program code to be executed by processing circuitry of a wireless device, whereby execution of the program code causes the wireless device to perform operations to:

switch the wireless device from INACTIVE or IDLE state to an ACTIVE state;

after switching to the ACTIVE state, determine by the wireless device whether a fulfillment or unfulfillment condition for radio measurement relaxation has been persistently met for at least a time-to-trigger (TTT) period, wherein the TTT period at least partially includes a time period during which the wireless device was in the INACTIVE or IDLE state;

after switching to the ACTIVE state, starting a timer having a timer duration; and in response to determining that the fulfillment or unfulfillment condition has been met for the TTT period, transmit a radio measurement relaxation report from the wireless device to a radio access network (RAN) node indicating that the fulfillment or unfulfillment condition has been met, wherein the radio measurement relaxation report is sent after expiration of the timer.

* * * * *